(12) United States Patent
Ramsey et al.

(10) Patent No.: US 11,395,456 B1
(45) Date of Patent: Jul. 26, 2022

(54) RAKE DEVICE FOR CLEANING RAIN GUTTERS AND ROOF VALLEYS

(71) Applicants: Mark C. Ramsey, Omaha, NE (US); Robert A. Foster, Omaha, NE (US)

(72) Inventors: Mark C. Ramsey, Omaha, NE (US); Robert A. Foster, Omaha, NE (US)

( * ) Notice: Subject to any disclaimer, the term of this patent is extended or adjusted under 35 U.S.C. 154(b) by 378 days.

(21) Appl. No.: 16/712,320

(22) Filed: Dec. 12, 2019

(51) Int. Cl.
| | |
|---|---|
| *A01D 7/04* | (2006.01) |
| *E04D 13/076* | (2006.01) |
| *A01D 7/06* | (2006.01) |
| *B25G 3/38* | (2006.01) |
| *A47L 13/08* | (2006.01) |

(52) U.S. Cl.
CPC ............... *A01D 7/04* (2013.01); *A01D 7/06* (2013.01); *B25G 3/38* (2013.01); *E04D 13/0765* (2013.01); *E04D 13/0767* (2013.01); *A47L 13/08* (2013.01)

(58) Field of Classification Search
CPC ... A01D 7/04; A01D 7/06; B25G 3/38; E04D 13/0765; E04D 13/0767; A47L 13/08
See application file for complete search history.

(56) References Cited

U.S. PATENT DOCUMENTS

| | | | | |
|---|---|---|---|---|
| 1,268,734 A | * | 6/1918 | Lay .................... | A46B 5/0083 81/177.8 |
| 2,552,016 A | * | 5/1951 | Rose .................. | A01D 7/04 37/241 |
| 3,626,542 A | | 12/1971 | Despain et al. | |
| 3,773,375 A | * | 11/1973 | Nehls .................. | E04D 13/106 16/427 |
| 4,402,106 A | | 9/1983 | Mattson | |
| 4,726,090 A | * | 2/1988 | Kilpatrick ........... | E04D 13/0765 294/181 |
| 4,848,818 A | * | 7/1989 | Smith ................. | E04D 13/0765 294/181 |
| D316,315 S | * | 4/1991 | Elrod .................. | D30/162 |
| 5,626,377 A | * | 5/1997 | Carroll, Jr. .......... | E04D 13/0765 294/104 |
| D380,655 S | * | 7/1997 | Dillon ................. | D8/13 |
| 5,771,535 A | * | 6/1998 | Blessing .............. | B25G 3/12 16/421 |
| 5,810,408 A | * | 9/1998 | Armstrong .......... | B25G 1/06 294/51 |
| 5,947,388 A | * | 9/1999 | Woodruff ............ | B05B 15/652 239/587.5 |
| 6,032,321 A | * | 3/2000 | Shirey ................. | B25G 1/06 15/144.4 |
| 6,189,222 B1 | * | 2/2001 | Doyle ................. | B26B 21/523 30/526 |
| 6,257,256 B1 | * | 7/2001 | Fischer ............... | B08B 3/026 134/167 C |
| 6,471,271 B1 | * | 10/2002 | Segal .................. | E04D 13/0765 294/111 |

(Continued)

FOREIGN PATENT DOCUMENTS

| | | | | |
|---|---|---|---|---|
| GB | 2260473 A | * | 4/1993 | ............... A01D 7/00 |
| WO | WO-2016069060 A1 | * | 5/2016 | ......... E04D 13/0765 |

*Primary Examiner* — Arpad Fabian-Kovacs
(74) *Attorney, Agent, or Firm* — Suiter Swantz pc llo (57) ABSTRACT

A rake device for cleaning rain gutters and roof valleys which includes a rake which is pivotally secured to an elongated support pole to enable the rake to be positioned in multiple positions with respect to the support pole to reach multiple portions of the rain gutter or the roof valley.

6 Claims, 9 Drawing Sheets

(56) References Cited

U.S. PATENT DOCUMENTS

| | | | |
|---|---|---|---|
| 6,925,676 B2* | 8/2005 | Heavner | E04D 13/0765 |
| | | | 294/176 |
| D509,415 S * | 9/2005 | Crites | D8/13 |
| 7,055,204 B2* | 6/2006 | Ajluni | A47L 1/06 |
| | | | 15/228 |
| D554,958 S | 11/2007 | Kelley et al. | |
| 7,334,825 B1* | 2/2008 | Sammon | B25H 5/00 |
| | | | 294/24 |
| 7,673,365 B1* | 3/2010 | Griffin, Sr. | E04F 21/242 |
| | | | 15/235.8 |
| 8,166,599 B2* | 5/2012 | Tomm | A47L 13/46 |
| | | | 15/228 |
| 8,510,910 B1 | 8/2013 | Ramsey | |
| 8,882,166 B2 | 11/2014 | Ramsey et al. | |
| 9,009,920 B1 | 4/2015 | Ramsey et al. | |
| 9,009,921 B1 | 4/2015 | Ramsey et al. | |
| 9,267,291 B1 | 2/2016 | Ramsey et al. | |
| 10,155,305 B2* | 12/2018 | Tzeng | B08B 1/005 |
| 2001/0042284 A1 | 11/2001 | Gutry | |
| 2003/0213086 A1 | 11/2003 | Heavner et al. | |
| 2004/0143931 A1 | 7/2004 | Dennis | |
| 2005/0134064 A1* | 6/2005 | Nies | B25G 1/06 |
| | | | 294/51 |
| 2006/0016047 A1* | 1/2006 | Blackman | B25G 1/06 |
| | | | 16/231 |
| 2010/0127521 A1* | 5/2010 | Thibault | A63B 47/02 |
| | | | 294/19.2 |
| 2015/0368905 A1* | 12/2015 | Nichols | E04D 13/0765 |
| | | | 134/8 |

* cited by examiner

RAKE DEVICE FOR CLEANING RAIN GUTTERS AND ROOF VALLEYS

BACKGROUND OF THE INVENTION

Field of the Invention

This invention relates to a rake device for cleaning rain gutters and roof valleys and more particularly relates to a rake device which is pivotally mounted on the upper end of an elongated support pole.

Description of the Related Art

Many types of devices have been previously provided to clean debris from rain gutters. For example, see U.S. Pat. Nos. 3,626,542 and 4,402,106 and Patent Application Publication Nos. 2001/0042284 A1 and 2004/0143931 A1. Applicants are the inventor or co-inventors of U.S. Pat. Nos. 8,510,910; 8,882,166; 9,009,920; 9,009,921; 9,267,291; and pending patent application PCT/US15/31050. Although Applicants' prior devices for cleaning rain gutters represent a distinct improvement in the rain gutter cleaning art, in some cases the debris in the rain gutter cannot be blown therefrom since the debris is stuck to the interior of the rain gutter. Further, to the best of Applicants' knowledge, the prior art is devoid of devices which may be utilized to not only clean rain gutters but to also clean roof valleys and other pockets of debris.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A rake device for cleaning rain gutters and roof valleys located above the ground is disclosed. The rake device includes an elongated support pole, having upper and lower ends, which has a rake member secured to the upper end of the support pole. The rake member is configured to be positioned in the rain gutter whereby the person using the rake device may rake debris from the rain gutter or loosen the debris in the rain gutter so that the debris may be washed or blown therefrom. The rake device may also be used to clean roof valleys. The rake member comprises an elongated first support member, having lower and upper ends, with the lower end of the first support member being threadably secured to the upper end of a support pole. The rake device of this invention also includes an elongated second support member having first and second ends. The first end of the second support member is selectively pivotally secured to the second end of the first support member. The rake device of this invention also has a third support member, having first and second ends, with the first end of the third support member being selectively pivotally secured to the second end of the second support member.

The outer end of the third support member has a plurality of spaced-apart and elongated tines extending therefrom which have inner and outer ends. An elongated rake tooth, having first and second ends, is secured to the outer end of each of the tines. Each rake tooth is secured to the respective tine intermediate the first and second ends of the rake tooth with the rake tooth being transversely disposed with respect to the respective tine whereby the first end of the rake tooth is positioned at the first side of the second support member and the second end of the rake tooth is positioned at the second side of the second support member.

It is therefore a principal object of the invention to provide an improved device for cleaning rain gutters and roof valleys.

A further device of the invention is to provide a device for cleaning rain gutters and roof valleys wherein a rake member is pivotally mounted at the upper end of a support pole by a plurality of pivot joints.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The rake device of this invention for cleaning a rain gutter 10 or roof valley is referred to generally by the reference number 12. Rake device 12 is mounted on the upper end 14 of a support pole 16 as will be described in greater detail hereinafter. Device 12 includes an elongated first support member 18 having a lower end 20 and an upper end 22. The lower end 20 of first support member 18 is internally threaded and is threadably secured to the upper end 14 of the support pole 16. Support member 18 has a plurality of gripping edges or ribs 24 formed thereon.

The upper end 22 of support member 18 has a cylindrical portion 26 formed therewith which has an inner side and an outer side. The inner side of cylindrical portion 26 has a plurality of radially extending teeth 28 formed therein.

The rake device 12 also includes an elongated second support member 30 having a first end 32 and a second end 34. The first end 32 of support member 30 has a cylindrical portion 36 formed therein which has inner and outer sides. The inner side of cylindrical portion 36 has a plurality of radially extending teeth 38 formed thereon. The teeth 38 of cylindrical portion 36 are in mesh with the teeth 28 of cylindrical portion 26 of support member 18. A bolt 40 extends through cylindrical portions 26 and 36, which is tightened by a wing nut 42, to selectively maintain the teeth 28 and 38 in mesh with another to selectively maintain support member 30 in various pivotal positions with respect to support member 18 to change the angular position of support member 30 with respect to support member 18 and pole 16. Support member 30 has a cylindrical portion 44 at the second end 34 thereof which has inner and outer sides. Cylindrical portion 44 has a bolt opening 46 formed therein. One side of cylindrical portion 44 is smooth and the other side thereof has radially extending teeth 47 formed therein.

Rake device 12 also includes an elongated third support member 48 having an inner end 50 and an outer end 52. The inner end 50 of support member 48 has a cylindrical portion 54 formed therein which has an inner side and an outer side. The inner side of cylindrical portion 54 is smooth. The outer side of cylindrical portion 54 has teeth 55 formed therein. Bolt 60 extends through opening 62 in cylindrical portion 54 and extends through opening 46 in cylindrical portion 44.

The engagement of the smooth inner side of cylindrical portion 54 provides a yieldable pivotal connection between support members 30 and 48 depending upon the tightening of the nut 64 on bolt 60.

If the user does want a yieldable pivot connection between support members 30 and 48, the support members 30 and 48 are rotated so that the teeth 47 of cylindrical portion 44 are in mesh with the teeth 55 of cylindrical portion 54.

A plurality of elongated and spaced-apart tines 68 extend outwardly from the outer end of support member 48. Each of the tines 68 has an outer end 70. An elongated flat tooth 72 is secured to the outer end 70 of each of the tines 68 so that each of the teeth 72 has oppositely extending ends 74 and 76. As seen, the teeth 72 are secured to the tines 68 intermediate the length of the teeth 72 so that the ends 74 and 76 are on opposite sides of the tines 68.

Figure 1:
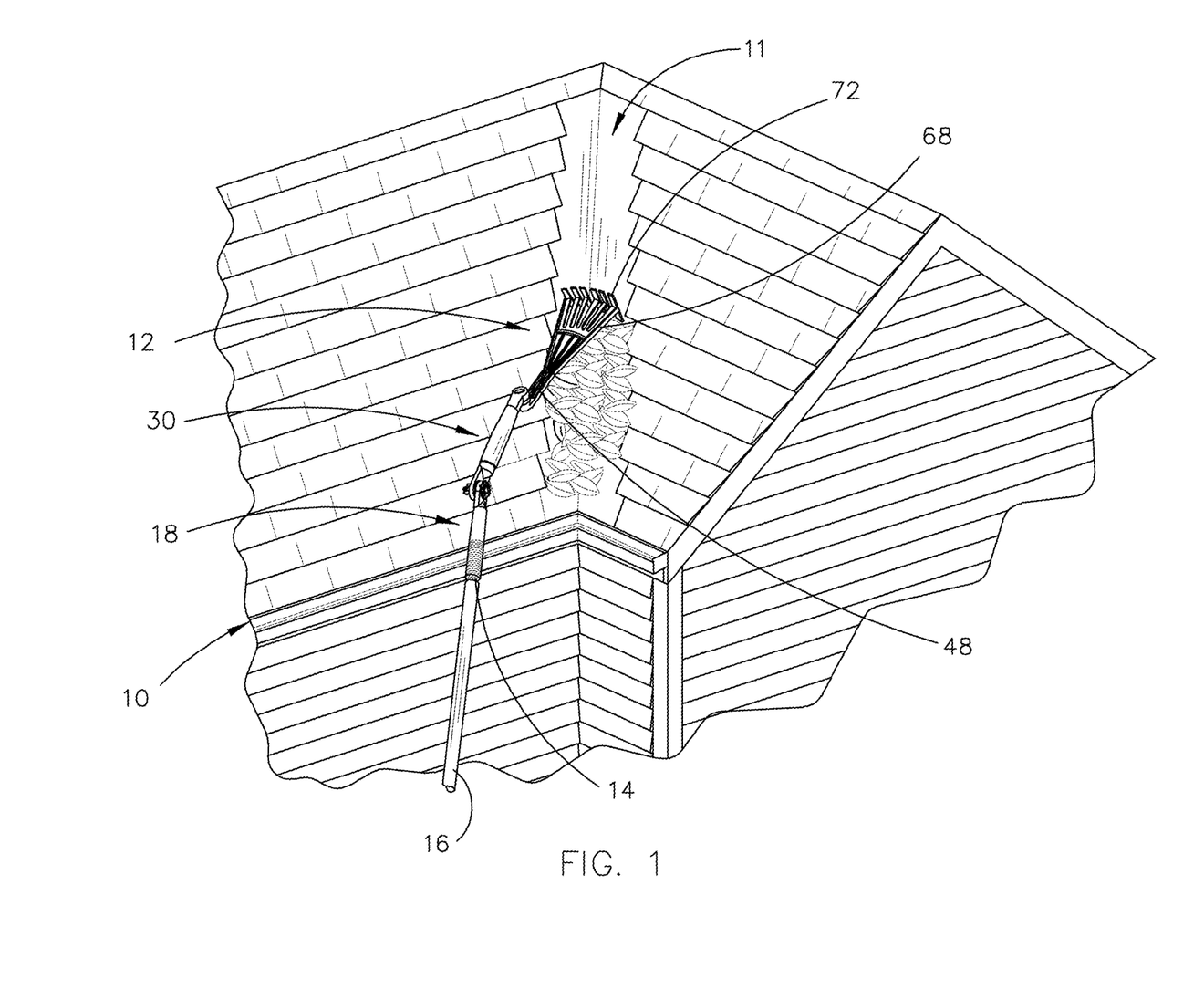
FIG. 1 is a perspective view illustrating a person using the rake device of this invention to clean a roof valley.
Figure 2:
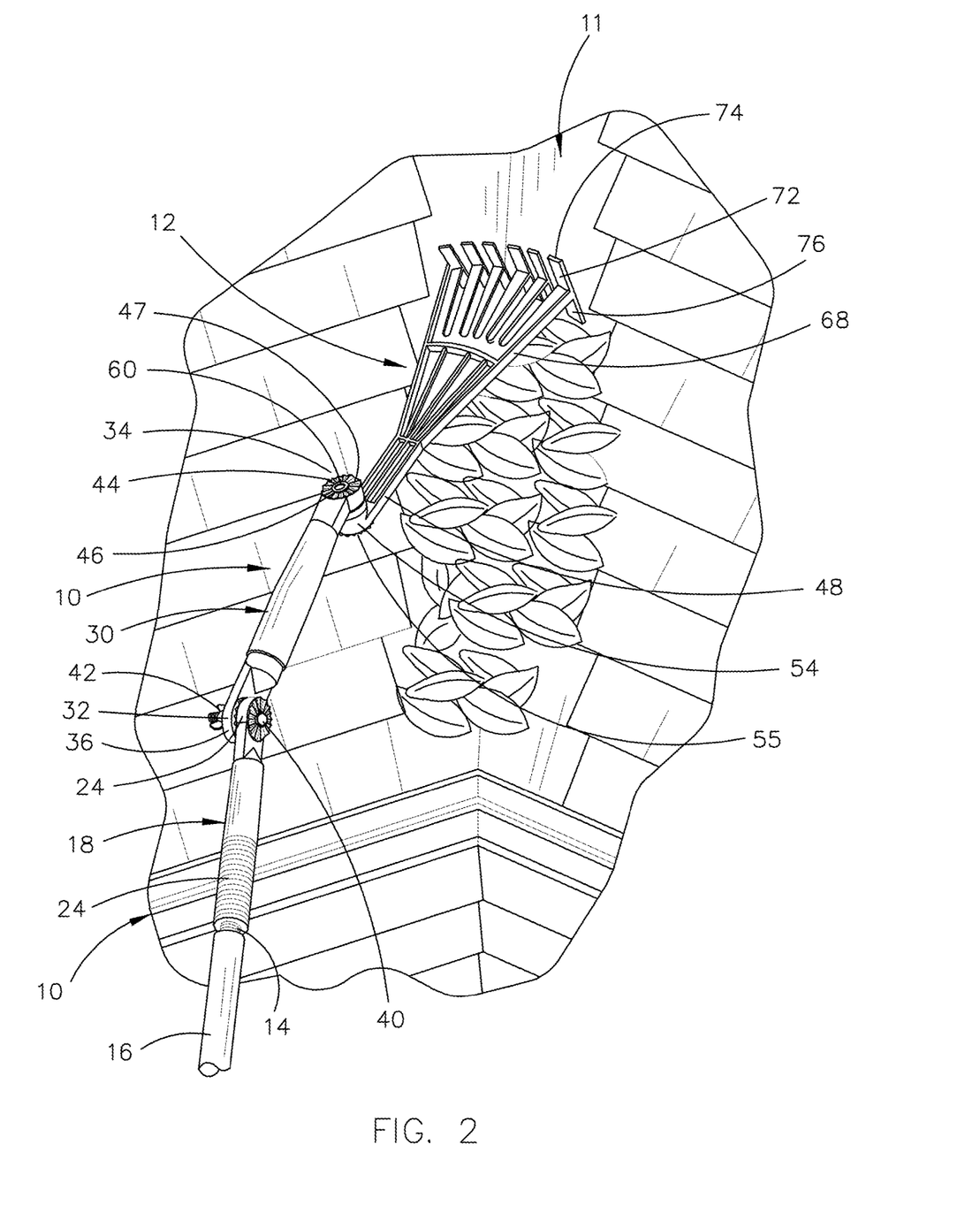
FIG. 2 is a partial perspective view illustrating the rake device of this invention being used to clean a roof valley.
Figure 3:
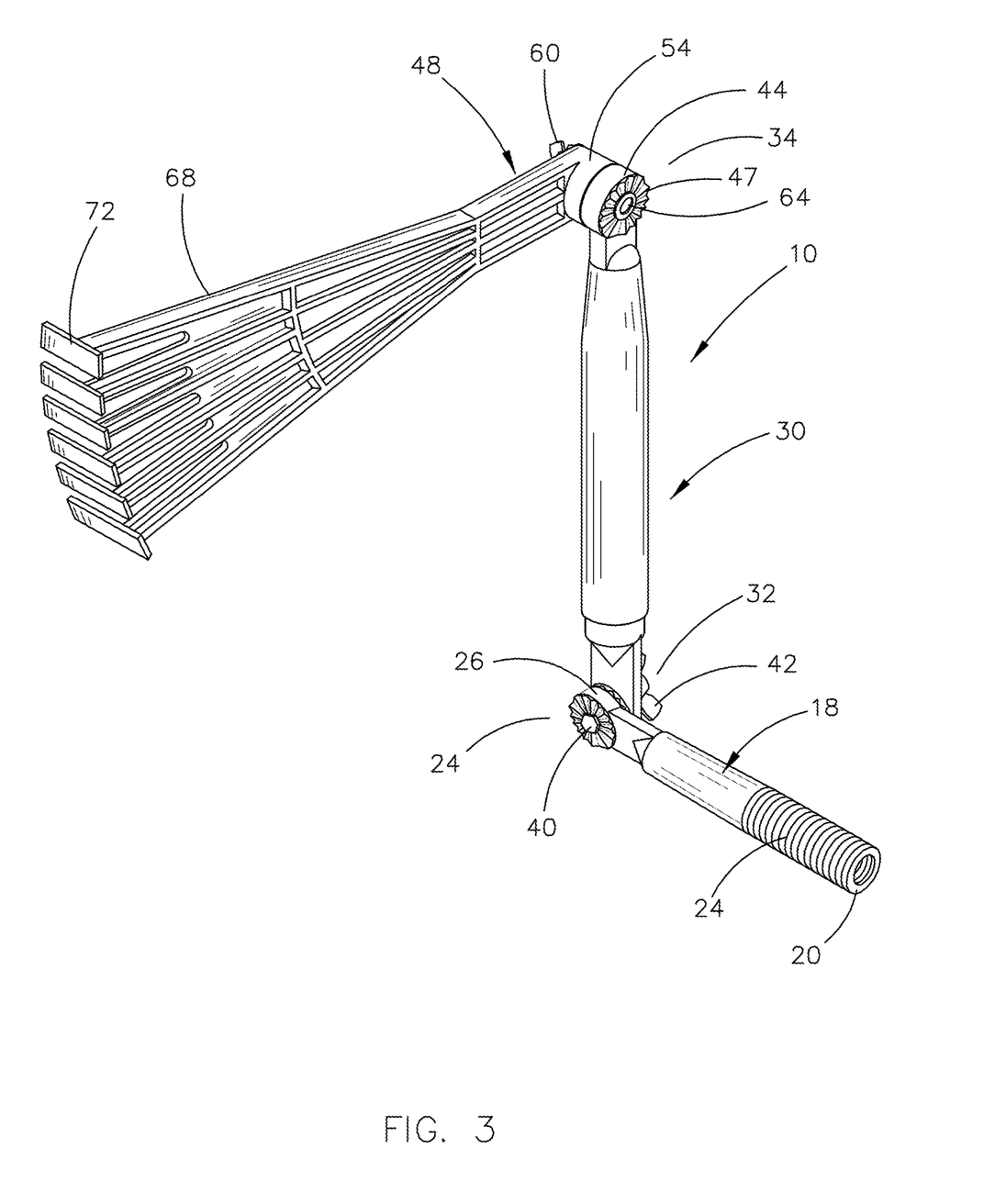
FIG. 3 is a perspective view of the rake device of this invention.
Figure 3A:
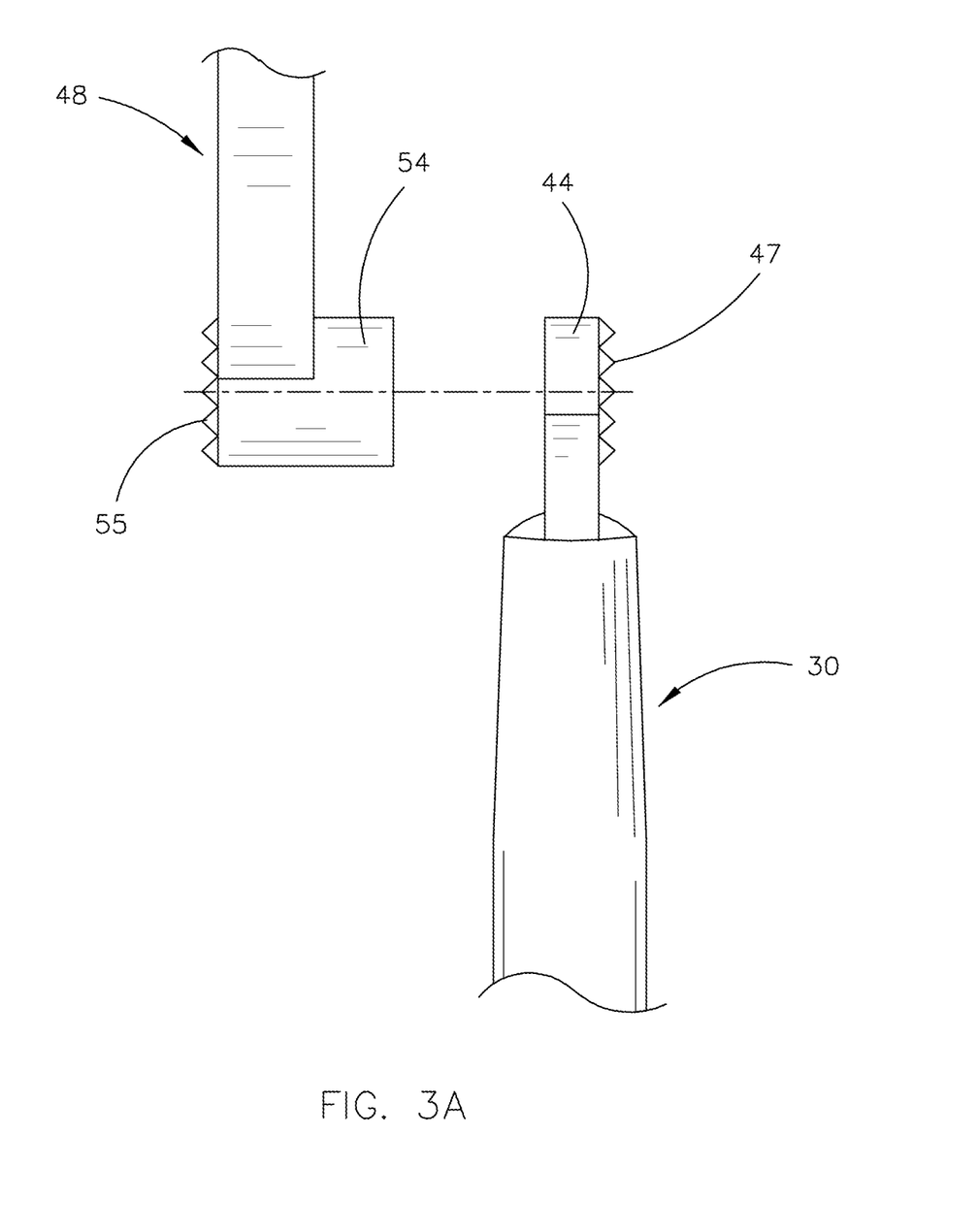
FIG. 3A is a partial exploded side view illustrating the relationship between the second support member and the third support member of this invention.
Figure 4:
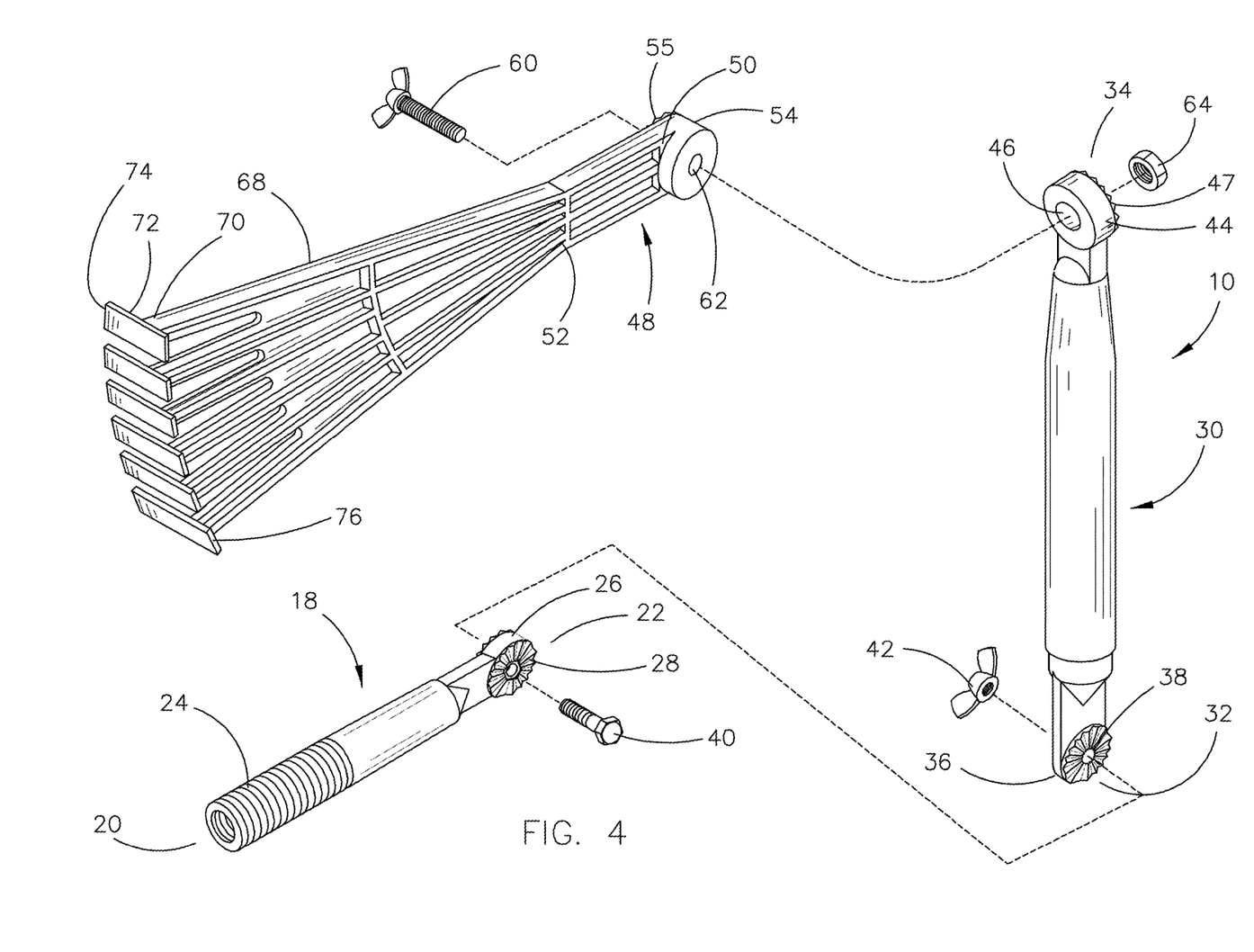
FIG. 4 is an exploded perspective view of the rake device of this invention.
Figure 5:
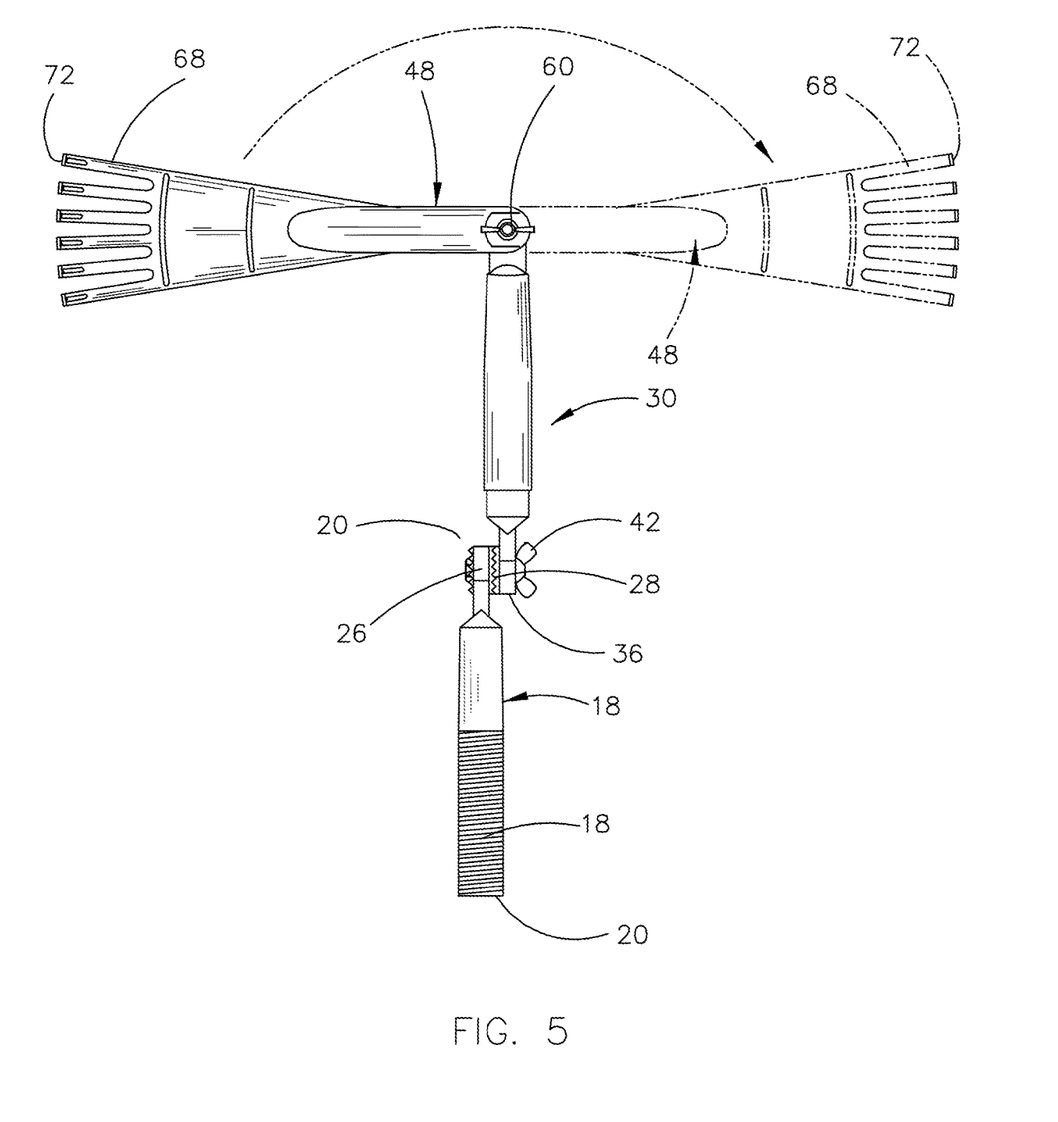
FIG. 5 is a side view of the rake device of this invention with the broken lines referring to an alternate position of the third support and the tines thereon.
Figure 6:
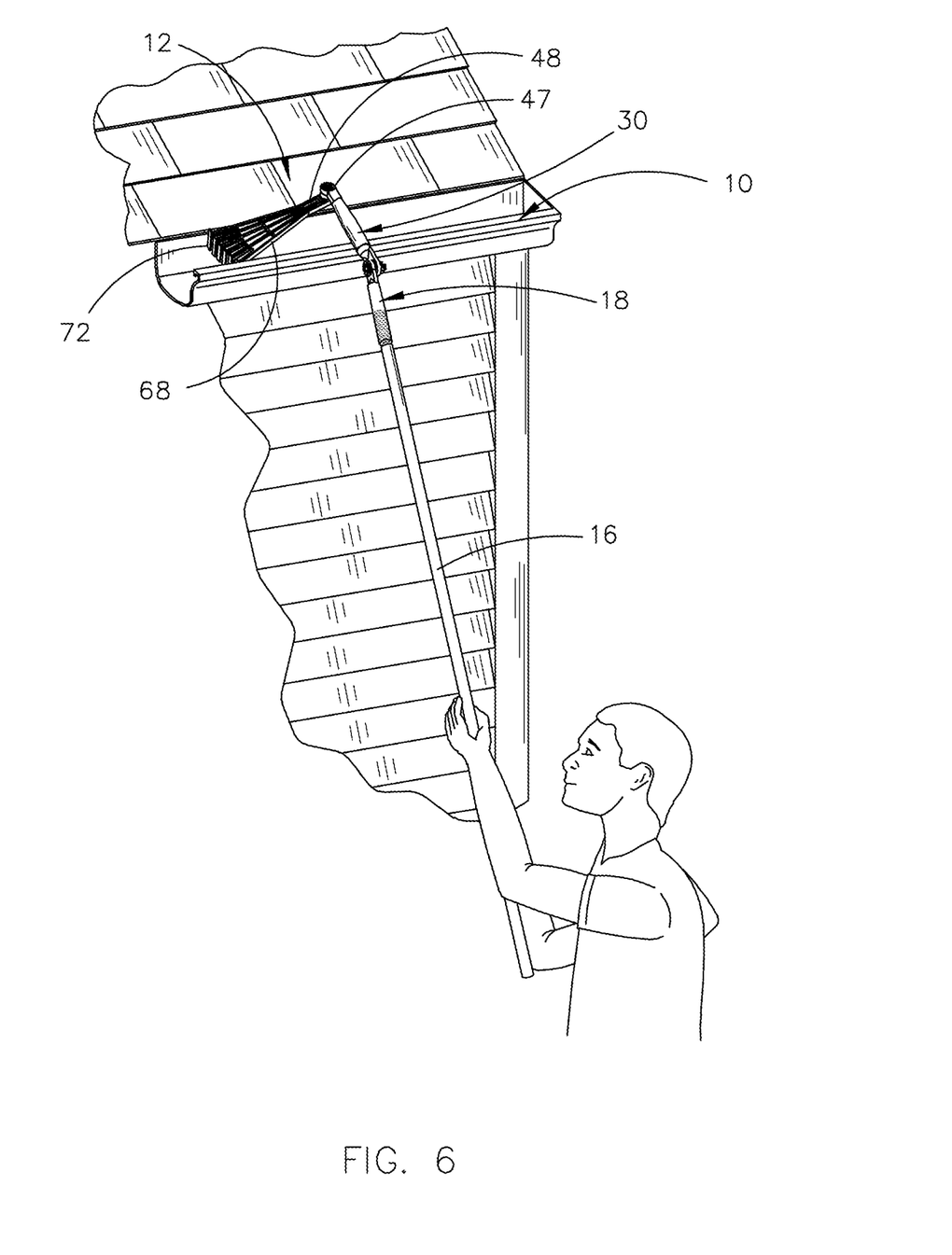
FIG. 6 is a perspective view illustrating the rake device of this invention being used to clean a rain gutter in a first direction.
Figure 7:
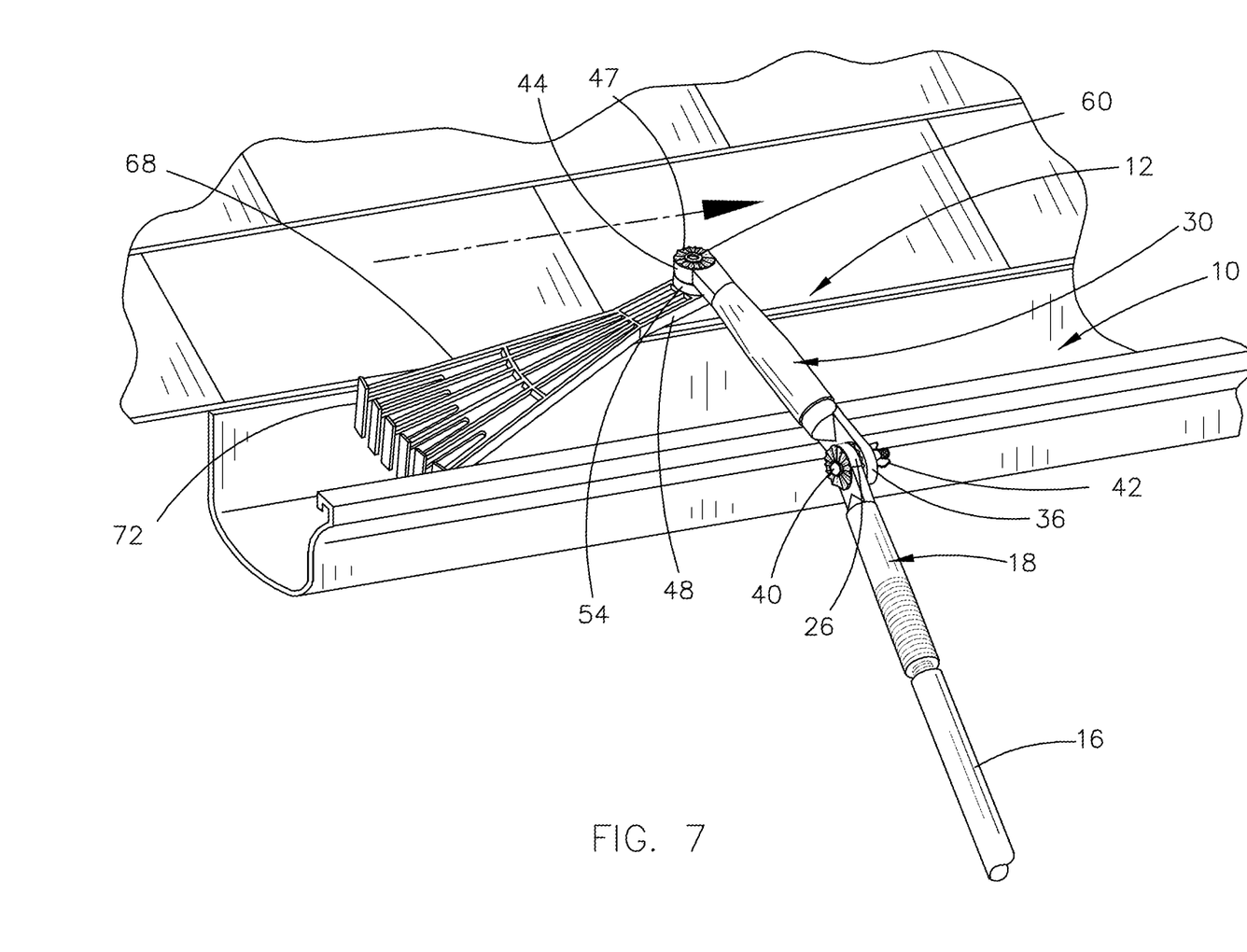
FIG. 7 is an enlarged view of a portion of FIG. 6.
Figure 8:
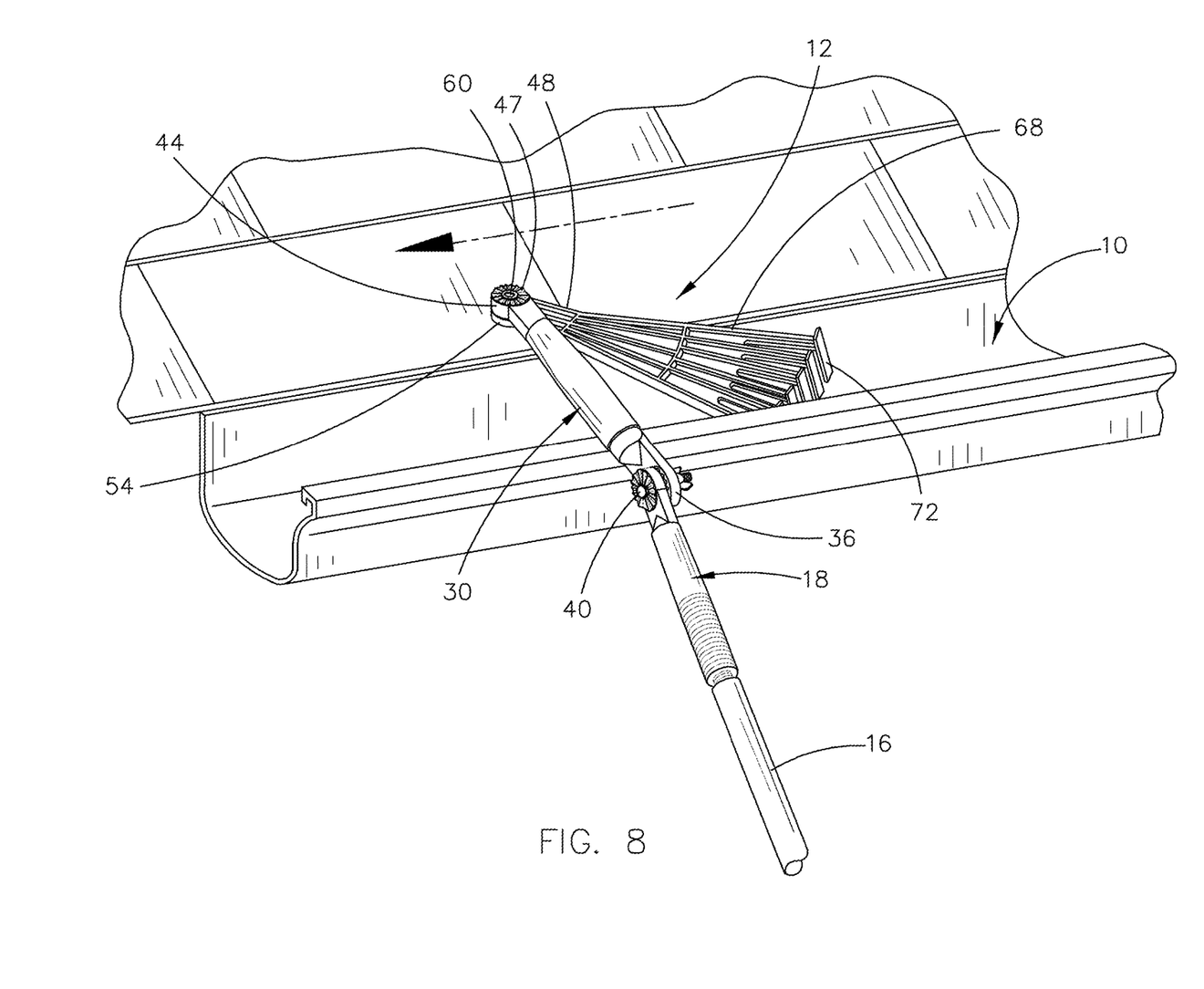
FIG. 8 is a perspective view illustrating the rake device of this invention being used to clean a rain gutter in a second direction.

The fact that the teeth 72 extend from both sides of the tines 68 enables the person using the device to move to the right as seen in FIG. 6 or to move the device 12 to the left as seen in FIG. 8.

The angle between the second support member 30 and the first support member 18 is easily changed by loosening the nut 42 on the bolt 40 and pivotally moving the second support member to the desired angular position. The nut 42 is then tightened to maintain the second support member 30 in the desired angular position with respect to the first support member 18 and the pole 16.

The angle of the third support member 48 with respect to the second support member 30 is easily changed. The third support member 48 may be pivoted with respect to the second support member 30 by grasping the third support member 48 or the tines 68 so as to cause the third support member 48 and the tines 68 thereon to pivotally move with respect to the second support member 18. Further, the angle of the third support member 48 with respect to pole 12 is easily changed by simply engaging the third support member 48, the tine support portion or the tines 68 thereon with the gutter 10, the valley 11 or some other structure and moving the pole 16 in the desired direction. If the yieldable pivotal connection between support members 30 and 48 is not desired, the teeth 47 and 55 are engaged as described above.

The fact that the first end of the second support member is pivotally secured, about a first pivot axis, to the upper end of the first support member and that the second end of the second support member is pivotally secured to the inner end of the third support member 48, about a second pivot axis, enables the rake to be pivotally secured to the upper end of the support pole by a plurality of joints which enables the rake to be pivoted to many different angles to clean a rain gutter or to clean a roof valley.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A rake device for cleaning rain gutters and roof valleys, comprising:

an elongated support pole having an upper end;

an elongated first support member having a lower end and an upper end;

said lower end of said first support member being selectively secured to said upper end of said elongated support pole;

said upper end of said first support member having a cylindrical portion formed therewith;

said cylindrical portion of said first support member having an inner side and an outer side;

said cylindrical portion of first support member having an opening formed therein which extends between said inner and outer sides thereof;

said inner side of said cylindrical portion of said first support member having a plurality of radially spaced-apart teeth formed therein;

an elongated second support member having a first end and a second end;

said first end of said second support member having inner and outer sides;

said first end of said second support member having a cylindrical portion, having inner and outer sides, extending from said inner side of said first end of said second support member;

said outer side of said cylindrical portion at said first end of said second support member having a plurality of radially spaced-apart teeth formed therein which are in engagement with said teeth of said cylindrical portion of said first support member;

said first end of said second support member and said cylindrical portion thereof having an opening extending therethrough which register with said opening formed in said cylindrical portion of said first support member;

a first threaded bolt extending through said opening in said cylindrical portion of said first support member and said openings in said first end of said second support member and said cylindrical portion of said second support member to provide a pivotal connection, having a first axis, between said upper end of said first support member and said first end of said second support member;

said first axis being transversely disposed at 90 degrees with respect to the lengths of said first and second support members;

a nut secured to said first threaded bolt for selectively maintaining said second support member in various pivotal positions with respect to said first support member;

said second end of said second support member having a cylindrical portion which has an inner side and an outer side;

said inner side of said cylindrical portion at said second end of said second support member being smooth;

said outer side of said cylindrical portion at said second end of said second support member having a plurality of teeth formed therein;

said cylindrical portion at said second end of said second support member having a bolt opening formed therein which extends between said inner and outer sides thereof;

a third support member having inner and outer ends;

a tine support portion having inner and outer ends;

said inner end of said tine support portion being secured to said outer end of said third support member;

said inner end of said third support member having a cylindrical portion formed therewith;

said cylindrical portion at said inner end of said third support member having an inner side and outer side;

said inner side of said cylindrical portion at said inner end of said third support member being smooth;

said outer side of said cylindrical portion at said inner end of said third support member having a plurality of radially spaced-apart teeth formed therein;

said cylindrical portion at said inner end of said third support member having a bolt opening formed therein which extends between said inner and outer sides thereof;

said inner side of said cylindrical portion at said inner end of said third support member being positioned at said inner side of said cylindrical portion at said second end of said second support member;

a second threaded bolt extending through said bolt opening in said cylindrical portion at said inner end of said third support member and said cylindrical portion at said second end of said second support member;

a nut secured to said second threaded bolt thereby providing a yieldable pivot connection between said second support member and said third support member about a second axis;

said second axis being transversely disposed at 90 degrees with respect to said first axis;

a plurality of elongated and spaced-apart tines extending outwardly and angularly from said outer end of said tine support portion;

each of said tines of said plurality of tines having an outer end;

an elongated and rectangular-shaped tooth secured to said outer end of each of said tines of said plurality of tines;

each of said elongated and rectangular-shaped teeth having oppositely extending ends, the oppositely extending ends including at least a first flat end and a second flat end;

said elongated and rectangular-shaped teeth being secured to said tines of said plurality of tines intermediate the oppositely extending ends of each of said elongated and rectangular-shaped teeth so that the ends of said elongated and rectangular-shaped teeth are on opposite sides of said tines of said plurality of tines, the first flat end on a first side of said tines and the second flat end on a second side of said tines, the first side of said tines being opposite from the second side of said tines; and said elongated and rectangular-shaped teeth being transversely disposed with respect to said outer ends of said tines of said plurality of tines; and said plurality of teeth having a length which is less than the width of the gutter being cleaned so that said outer ends of said plurality of teeth may be positioned in the gutter.

2. The combination of claim 1 wherein said first and second support members are comprised of a plastic material.

3. In combination:

an elongated support pole having a lower end and an upper end;

an elongated first support member having a first end and a second end;

said first end of said first support member being selectively removably secured to upper end of said support pole so as to extend therefrom in a parallel manner;

an elongated second support member having a first end and a second end;

a first pivot joint selectively pivotally connecting said second end of said first support member to said first end of said second support member about a first pivot axis which is transversely disposed at 90 degrees with respect to the lengths of said first and second support members;

an elongated rake for cleaning rain gutters and roof valleys with the rake having an inner end and an outer end, wherein said rake includes a plurality of tines having inner and outer ends, wherein a transversely extending elongated and rectangular-shaped tooth is secured to said outer end of each of said tines, each of said elongated and rectangular-shaped teeth having oppositely extending ends, the oppositely extended ends including at least a first flat end and a second flat end, the first flat end on a first side of said tines and the second flat end on a second side of said tines, the first side of said tines being opposite from the second side of said tines; and a second pivot joint selectively pivotally connecting said second end of said second support member to said inner end of said rake about a second pivot axis which is disposed at 90 degrees with respect to said first pivot axis.

4. The combination of claim 3 wherein said rake includes an elongated third support member, having inner and outer ends, and which is positioned at said inner end of said rake and wherein said second pivot joint connects said second end of said second support member to said inner end of said third support member.

5. The combination of claim 4 wherein said first support member, said second support member, said third support member and said tines are comprised of a plastic material.

6. A rake device for cleaning rain gutters and roof valleys, comprising:

an elongated support pole having an upper end;

an elongated first support member having a lower end and an upper end;

said lower end of said first support member being selectively secured to said upper end of said elongated support pole;
said upper end of said first support member having a cylindrical portion formed therewith;
said cylindrical portion of said first support member having an inner side and an outer side;
said cylindrical portion of first support member having an opening formed therein which extends between said inner and outer sides thereof;
said inner side of said cylindrical portion of said first support member having a plurality of radially spaced-apart teeth formed therewith;
an elongated second support member having a first end and a second end;
said first end of said second support member having inner and outer sides;
said first end of said second support member having a cylindrical portion, having inner and outer sides, extending from said inner side of said first end of said second support member;
said outer side of said cylindrical portion at said first end of said second support member having a plurality of radially spaced-apart teeth formed therein which are in engagement with said teeth of said cylindrical portion of said first support member;
said first end of said second support member and said cylindrical portion thereof having an opening extending therethrough which register with said opening formed in said cylindrical portion of said first support member;
a first threaded bolt extending through said opening in said cylindrical portion of said first support member and said openings in said first end of said second support member and said cylindrical portion of said second support member to provide a pivotal connection, having a first axis, between said upper end of said first support member and said first end of said second support member;
said first axis being transversely disposed at 90 degrees with respect to the lengths of said first and second support member;
a nut secured to said first threaded bolt for selectively maintaining said second support member in various pivotal positions with respect to said first support member;
said second end of said second support member having a cylindrical portion which has an inner side and an outer side;
said cylindrical portion at said second end of said second support member having a bolt opening formed therein which extends between said inner and outer sides thereof;
a third support member having inner and outer ends;
a plurality of elongated and spaced-apart tines extending outwardly and angularly from said outer end of said tine support portion;
plurality of tines extending outwardly and angularly from said outer end of said third support member;
each of said tines of said plurality of tines having an outer end;
an elongated and rectangular-shaped tooth secured to said outer end of each of said tines of said plurality of tines;
each of said elongated and rectangular-shaped teeth having oppositely extending ends, the oppositely extending ends including at least a first flat end and a second flat end;
said elongated and rectangular-shaped teeth being secured to said tines of said plurality of tines intermediate the oppositely extending ends of each of said elongated and rectangular-shaped teeth so that the ends of said elongated and rectangular-shaped teeth are on opposite sides of said tines of said plurality of tines, the first flat end on a first side of said tines and the second flat end on a second side of said tines, the first side of said tines being opposite from the second side of said tines; and
said elongated and rectangular-shaped teeth being transversely disposed with respect to said outer ends of said tines of said plurality of tines; and
said plurality of teeth having a length which is less than the width of the gutter being cleaned so that said outer ends of said plurality of teeth may be positioned in the gutter.

* * * * *